United States Patent
Bastos et al.

(10) Patent No.: US 7,403,208 B1
(45) Date of Patent: Jul. 22, 2008

(54) GENERATION OF JITTERED SUB-PIXEL SAMPLES USING PROGRAMMABLE SUB-PIXEL OFFSETS

(75) Inventors: Rui M. Bastos, Santa Clara, CA (US); Nathan A. Carr, Urbana, IL (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/389,602

(22) Filed: Mar. 23, 2006

Related U.S. Application Data

(62) Division of application No. 10/726,125, filed on Dec. 2, 2003, now Pat. No. 7,050,068.

(51) Int. Cl.
*G09G 5/00* (2006.01)
(52) U.S. Cl. .................................... 345/613
(58) Field of Classification Search ......... 345/611–616; 382/269
See application file for complete search history.

(56) References Cited

U.S. PATENT DOCUMENTS

| | | | |
|---|---|---|---|
| 5,673,376 A * | 9/1997 | Ray et al. | 345/427 |
| 6,285,348 B1 * | 9/2001 | Lewis | 345/614 |
| 7,050,068 B1 | 5/2006 | Bastos et al. | |
| 2001/0033287 A1 | 10/2001 | Naegle et al. | |
| 2002/0140706 A1 * | 10/2002 | Peterson et al. | 345/611 |
| 2003/0122829 A1 | 7/2003 | McNamara et al. | |
| 2004/0012600 A1 * | 1/2004 | Deering et al. | 345/506 |

* cited by examiner

*Primary Examiner*—Kee M. Tung
*Assistant Examiner*—Aaron M Richer
(74) *Attorney, Agent, or Firm*—Patterson & Sheridan LLP

(57) ABSTRACT

Jittered sub-pixel samples are used to reduce aliasing during rendering in a graphics pipeline. Sub-pixel samples are jittered using programmed sub-pixel offset values, permitting an application to select not only the number of sub-pixel samples within a pixel, but also the position of each sub-pixel sample within the pixel.

17 Claims, 8 Drawing Sheets

| 305 |
|---|

FIG. 3A

| 310 |
|---|
| 315 |
| 320 |
| 325 |
| 330 |
| 335 |
| 340 |

FIG. 3B

| 0.25 |
|---|
| 0.40 |
| 0.30 |
| 0.10 |
| 0.05 |
| 0.13 |
| 0.48 |

FIG. 3C

GENERATION OF JITTERED SUB-PIXEL SAMPLES USING PROGRAMMABLE SUB-PIXEL OFFSETS

CROSS-REFERENCE TO RELATED APPLICATIONS

This application is a divisional of U.S. patent application Ser. No. 10/726,125, filed Dec. 2, 2003 now U.S. Pat. No. 7,050,068. Each of the aforementioned related patent applications is herein incorporated by reference.

FIELD OF THE INVENTION

One or more aspects of the invention generally relate to computer graphics, and more particularly to antialiasing in a computer graphics processing pipeline.

BACKGROUND

Conventional graphics processors are exemplified by systems and methods developed to reduce aliasing using supersampling or multisampling techniques that use fixed positions for sub-pixel samples. However, conventionally each pixel has the same fixed sub-pixel position, i.e., the sub-pixel positions are periodic. The human perception system is tuned to detect regular patterns, appearing as aliasing artifacts. To reduce aliasing, the sub-pixel positions should be non-periodic or vary over a region larger than a pixel. Furthermore, the sub-pixel sample positions should be programmable rather than fixed to allow an application to select a specific pattern, including a pattern that varies of several pixels.

There is thus a need for allowing flexibility in determining the positions of sub-pixel samples, including the ability to specify non-periodic sub-pixel positions to reduce aliasing.

SUMMARY

The current invention involves new systems and methods for allowing flexibility in determining the positions of sub-pixel samples, including non-periodic sub-pixel positions to reduce aliasing of images rendered using a graphics processor.

Various embodiments of a method of the invention include a method of determining sub-pixel sample positions for a pixel position to reducing aliasing. A programmed first sub-pixel offset value is read. A programmed second sub-pixel offset value is read. A jittered sub-pixel sample position is read using the first sub-pixel offset value, the second sub-pixel offset value, and the pixel position.

Various embodiments of the invention include a programmable sample generation unit. The programmable sample generation unit includes a storage element configured to store programmed sub-pixel offset values. An offset access unit configured to read a portion of the sub-pixel offset values is coupled to the storage element. A sample computation unit is configured to combine a pixel position and the portion of the sub-pixel offset values to produce at least two sub-pixel sample positions.

Various embodiments of the invention include a programmable graphics processor for generating antialiased images. The programmable graphics processor includes a rasterizer, a shader, and a raster operations unit. The rasterizer is configured to produce sub-pixel coverage data associated with a fragment using programmed jittered sub-pixel sample positions. The shader is configured to compute a depth value corresponding to the fragment depth at a pixel position. The raster operations unit is configured to produce sub-pixel depth values using the depth value corresponding to the fragment depth at a pixel position and the programmed jittered sub-pixel sample positions.

Various embodiments of the invention include a computing system. The computing system includes a host processor, a host memory, a system interface, and a graphics processor. The host memory stores programs for the host processor. The system interface is configured to interface with the host processor and the graphics processor. The graphics processor includes a sub-pixel sample generation unit configured to produce sub-pixel samples using programmed offset values.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIGS. 3A, 3B, and 3C illustrate storage of one or more sub-pixel offset values in accordance with one or more aspects of the present invention.

Figure 4A:
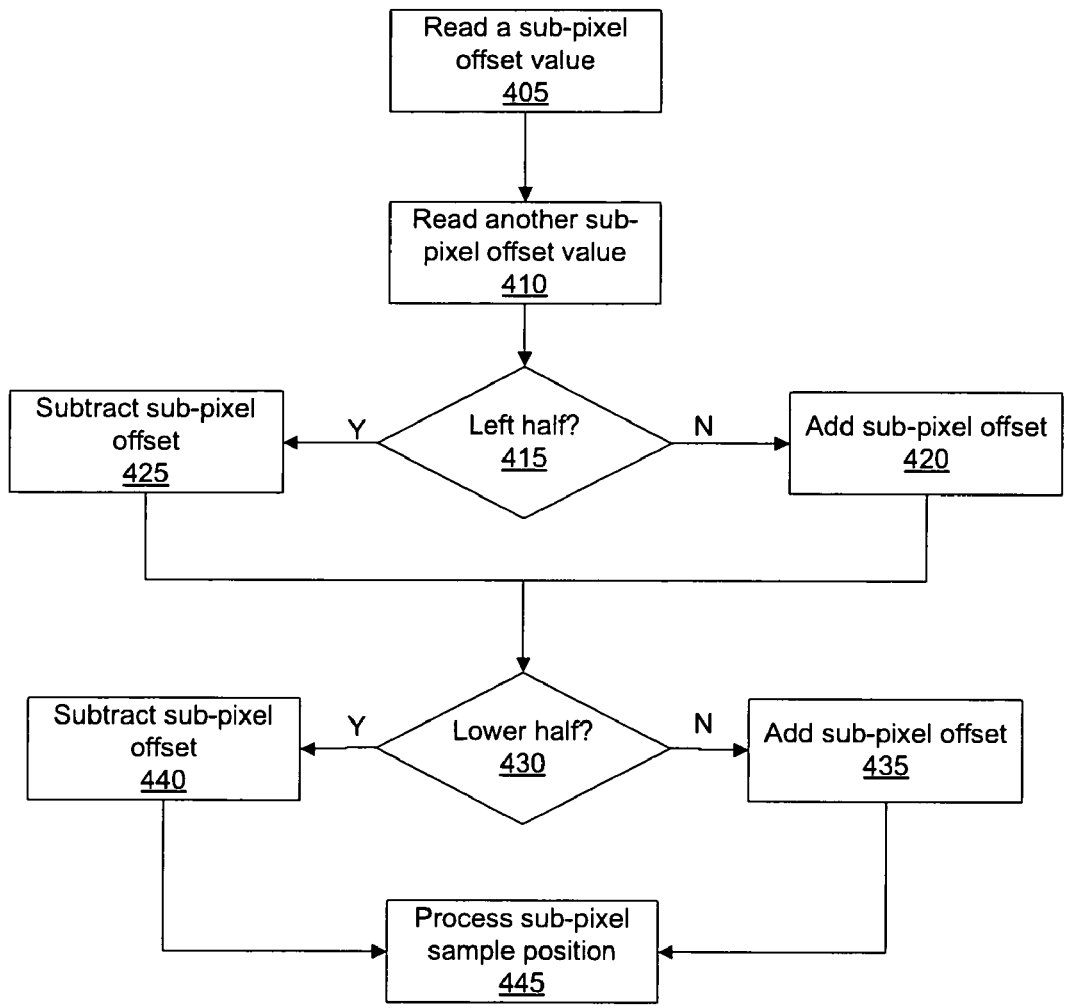

FIG. 4A illustrates an embodiment of a method of computing a sub-pixel sample position in accordance with one or more aspects of the present invention.

Figure 4B:
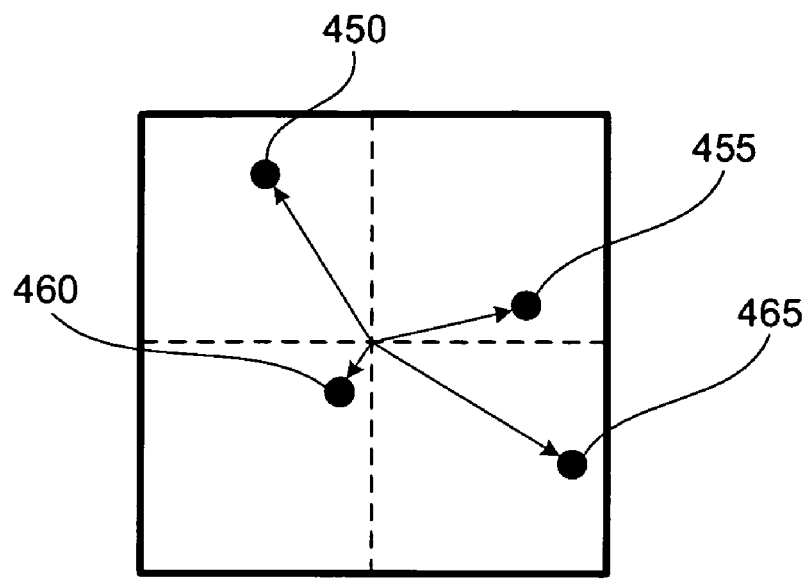
Figure 4C:
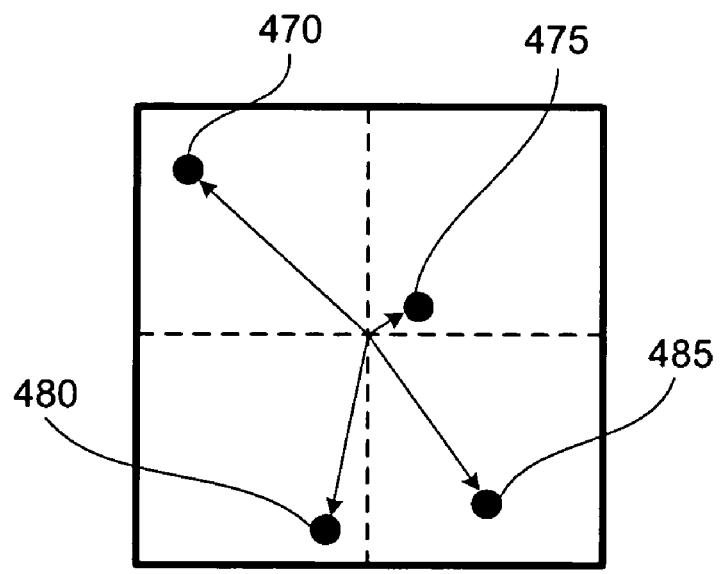

FIGS. 4B and 4C illustrate computed sub-pixel positions of samples within pixels in accordance with one or more aspects of the present invention.

Figure 1:
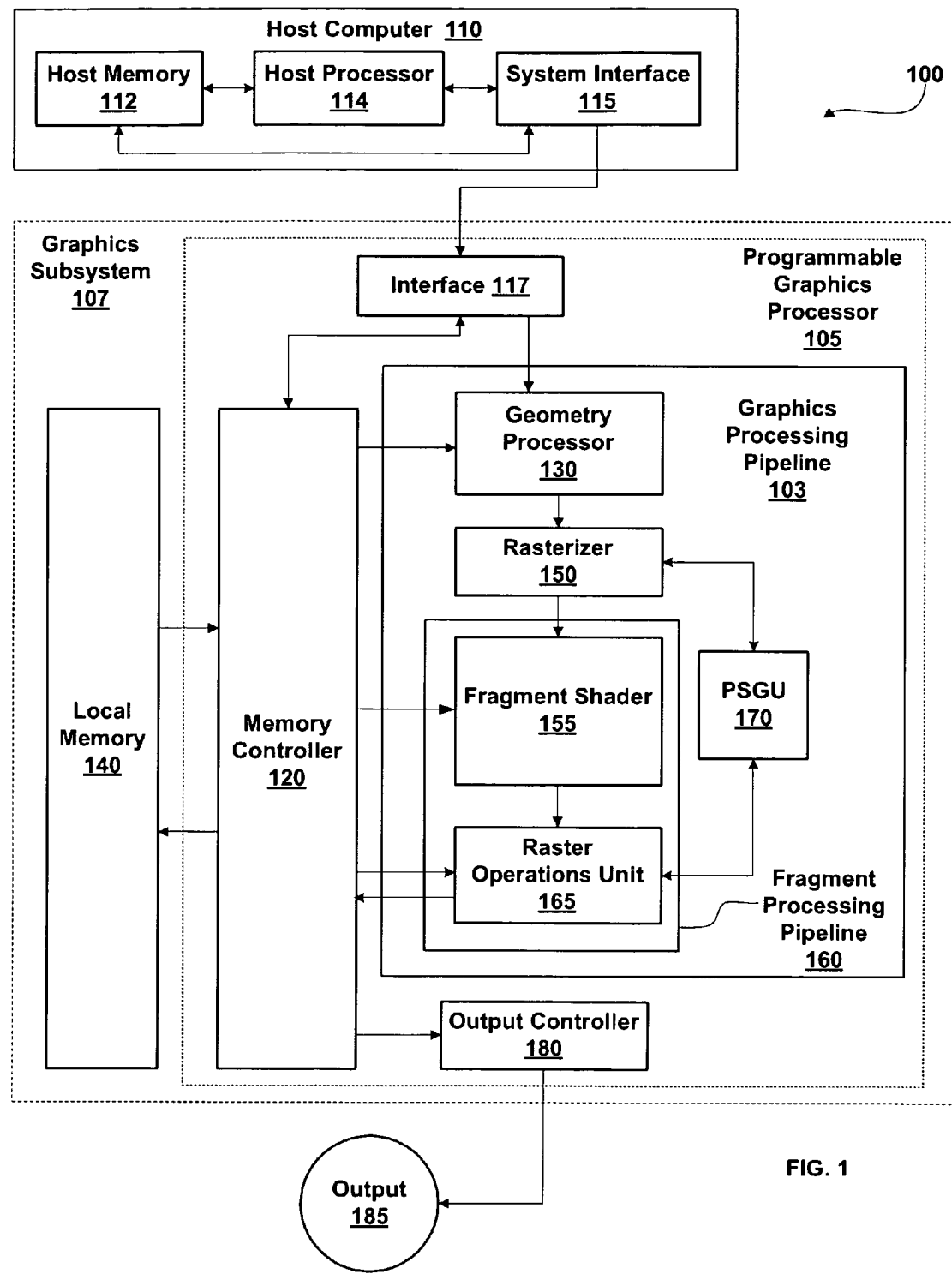
FIG. 1 is a block diagram of an exemplary embodiment of a respective computer system in accordance with one or more aspects of the present invention including a host computer and a graphics subsystem.
Figure 5:
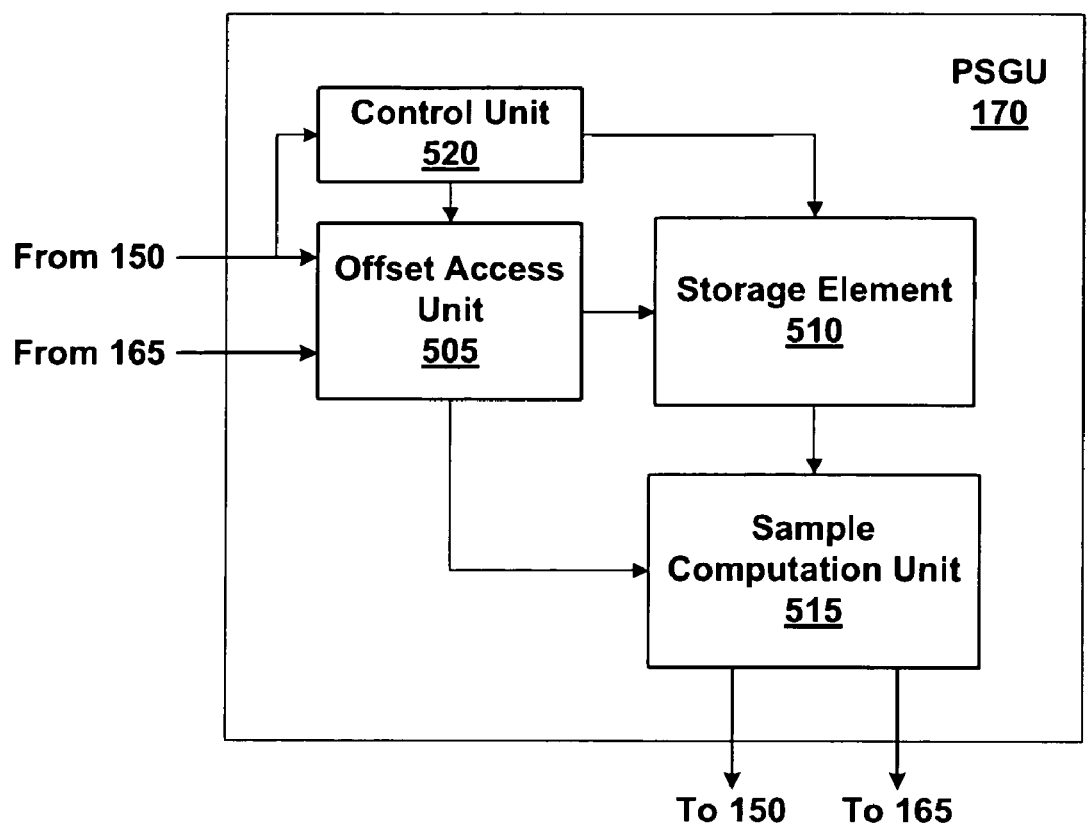

FIG. 5 is a block diagram of an exemplary embodiment of the programmable sub-pixel generation unit of FIG. 1 in accordance with one or more aspects of the present invention.

Figure 6:
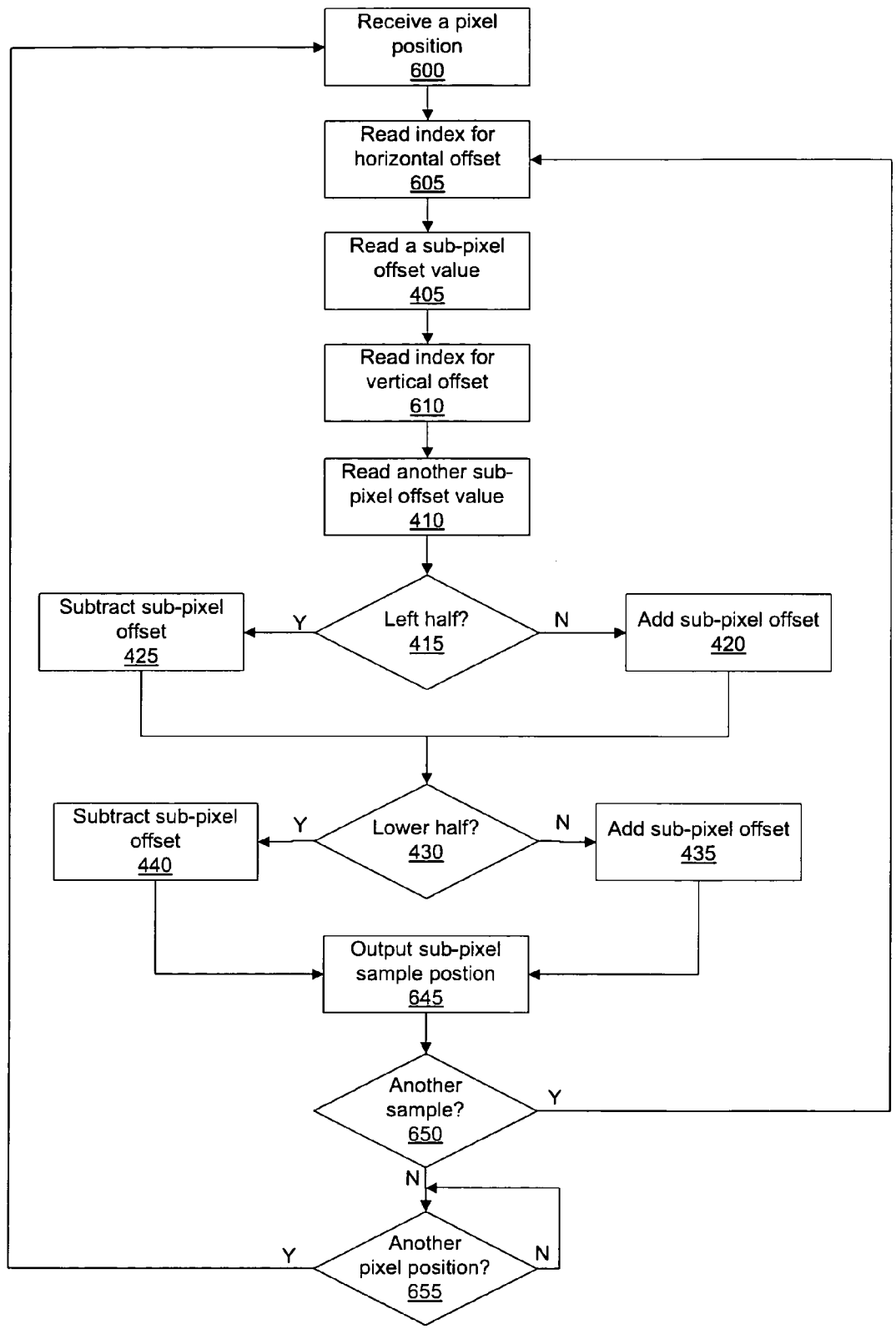

FIG. 6 illustrates an embodiment of a method of computing a sub-pixel position using a portion of a pixel position in accordance with one or more aspects of the present invention.

Figure 7:
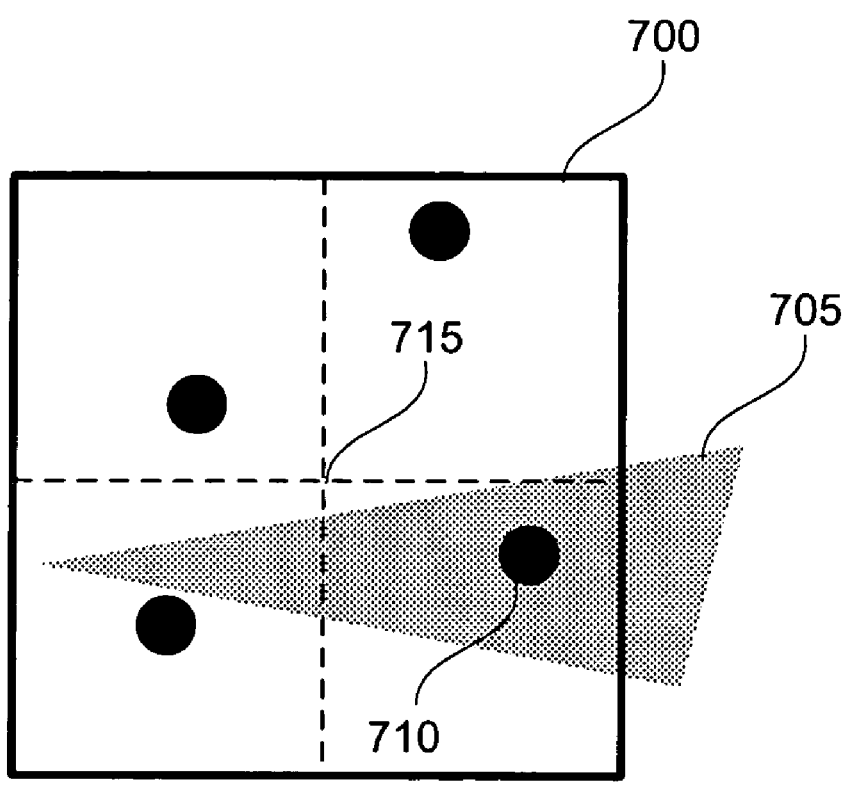

FIG. 7 illustrates a pixel covered by a fragment which does not cover the pixel center.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and an Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from computation units within Programmable Graphics Processor 105. Graphics memory is any memory used to store graphics data or program instructions to be executed by Programmable Graphics Processor 105. Graphics memory can include portions of Host Memory 112, Local Memory 140 directly coupled to Programmable Graphics Processor 105, storage resources coupled to the computation units within Programmable Graphics Processor 105, and the like. Storage resources can include register files, caches, FIFOs (first in first out), and the like.

In addition to Interface 117, Programmable Graphics Processor 105 includes a Graphics Processing Pipeline 103, a Memory Controller 120 and an Output Controller 180. Data and program instructions received at Interface 117 can be passed to a Geometry Processor 130 within Graphics Processing Pipeline 103 or written to Local Memory 140 through Memory Controller 120. In addition to communicating with Local Memory 140, and Interface 117, Memory Controller 120 also communicates with Graphics Processing Pipeline 103 and Output Controller 180 through read and write interfaces in Graphics Processing Pipeline 103 and a read interface in Output Controller 180.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple internal passes through Fragment Processing Pipeline 160. Each pass through Programmable Graphics Processor 105, Graphics Processing Pipeline 103 or Fragment Processing Pipeline 160 concludes with optional processing by a Raster Operations Unit 165.

Vertex programs are sequences of vertex program instructions compiled by Host Processor 114 for execution within Geometry Processor 130 and Rasterizer 150. Fragment programs are sequences of fragment program instructions compiled by Host Processor 114 for execution within Fragment Processing Pipeline 160. Geometry Processor 130 receives a stream of program instructions (vertex program instructions and fragment program instructions) and data from Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory, e.g., portions of Host Memory 112, Local Memory 140, or storage resources within Programmable Graphics Processor 105. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, such as pixel data or fragment data, including coverage data. Coverage data indicates which sub-pixel sample positions within a pixel are "covered" by a fragment formed by the intersection of the pixel and a primitive. Graphics primitives include geometry, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 computes sub-pixel sample positions using programmed sub-pixel offset values read from PSGU (Programmable Sample Generation Unit) 170, as described further herein. Rasterizer 150 outputs fragment data and fragment program instructions to Fragment Processing Pipeline 160.

The fragment programs configure the Fragment Processing Pipeline 160 to process fragment data by specifying computations and computation precision. Fragment Shader 155 is optionally configured by fragment program instructions such that fragment data processing operations are performed in multiple internal passes within Fragment Shader 155. Fragment Shader 155 outputs processed fragment data, e.g., color and depth, and codewords generated from fragment program instructions to Raster Operations Unit 165. When configured to perform multisampling, Raster Operations Unit 165 computes sub-pixel depth values for each sub-pixel sample position using fragment depth data received from Fragment Shader 155 and sub-pixel offset values read from PSGU 170.

In an alternate embodiment a PSGU 170 is included within Rasterizer 150 and another PSGU 170 is included within Raster Operations Unit 165. Furthermore, in one embodiment Raster Operations Unit 165 replicates the color fragment data received from Fragment Shader 155 for each sub-pixel sample position. In another embodiment Raster Operations Unit 165 computes sub-pixel color values for each sub-pixel sample position using the fragment color data received from Fragment Shader 155 and sub-pixel offset values read from PSGU 170. In yet another embodiment Fragment Shader 155 computes and processes sub-pixel color values for each sub-pixel sample position using fragment color data received from Rasterizer 150 and sub-pixel offset values read from PSGU 170. Processing sub-pixel color values may reduce color space aliasing resulting from color variations between sub-pixel sample positions within a pixel.

Raster Operations Unit 165 includes a read interface and a write interface to Memory Controller 120 through which Raster Operations Unit 165 accesses data stored in Local Memory 140 or Host Memory 112. Raster Operations Unit 165 optionally performs near and far plane clipping and raster operations, such as stencil, z test, blending, and the like, using the sub-pixel fragment data and pixel data stored in Local Memory 140 or Host Memory 112 at a pixel position (image location specified by x,y coordinates) associated with the processed fragment data. The output data from Raster Operations Unit 165 is written back to Local Memory 140 or Host Memory 112 at the pixel position associated with the output data and the results, e.g., image data are saved in graphics memory.

When processing is completed, an Output 185 of Graphics Subsystem 107 is provided using Output Controller 180. Alternatively, Host Processor 114 reads the image stored in Local Memory 140 through Memory Controller 120, Interface 117 and System Interface 115. Output Controller 180 is optionally configured by opcodes to deliver data to a display device, network, electronic control system, other Computing System 100, other Graphics Subsystem 107, or the like. Furthermore, Output Controller 180 is optionally configured by opcodes to downfilter the image data, e.g., multi-sampled color data, combining the sub-pixel samples within each pixel to produce filtered pixels for display. In an alternate embodiment, the multi-sampled color data is downfiltered by rendering geometry data and mapping the multi-sampled color data onto the geometry as a texture map. In the alternate embodiment, downfiltering is accomplished using texture map filtering, e.g., trilinear, anisotropic, and the like, within Fragment Shader 155.

Figure 2A:
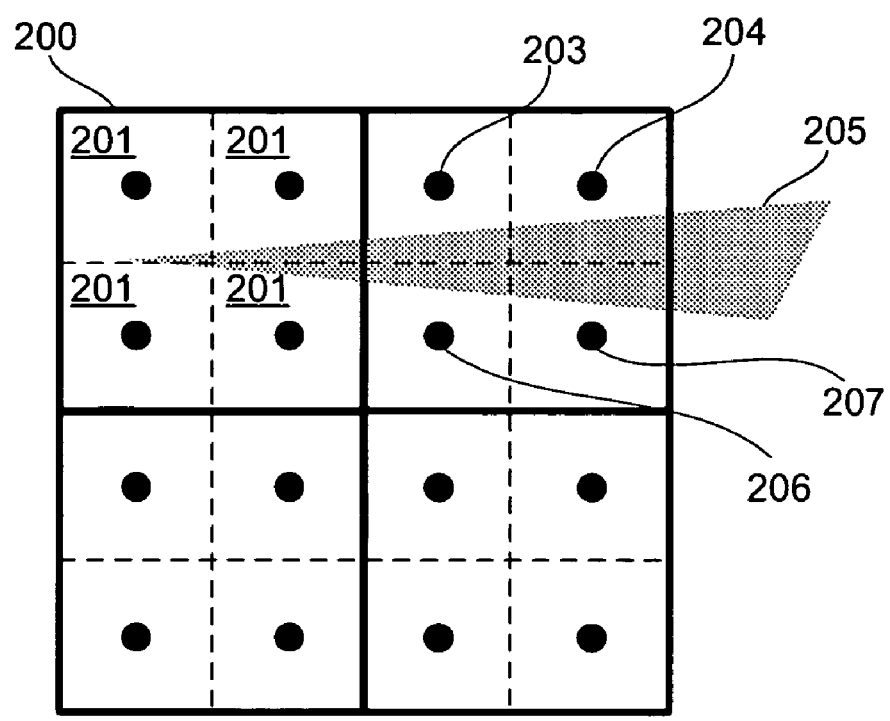
FIGS. 2A and 2B illustrate sub-pixel positions of samples within pixels in accordance with one or more aspects of the present invention.
Figure 2B:
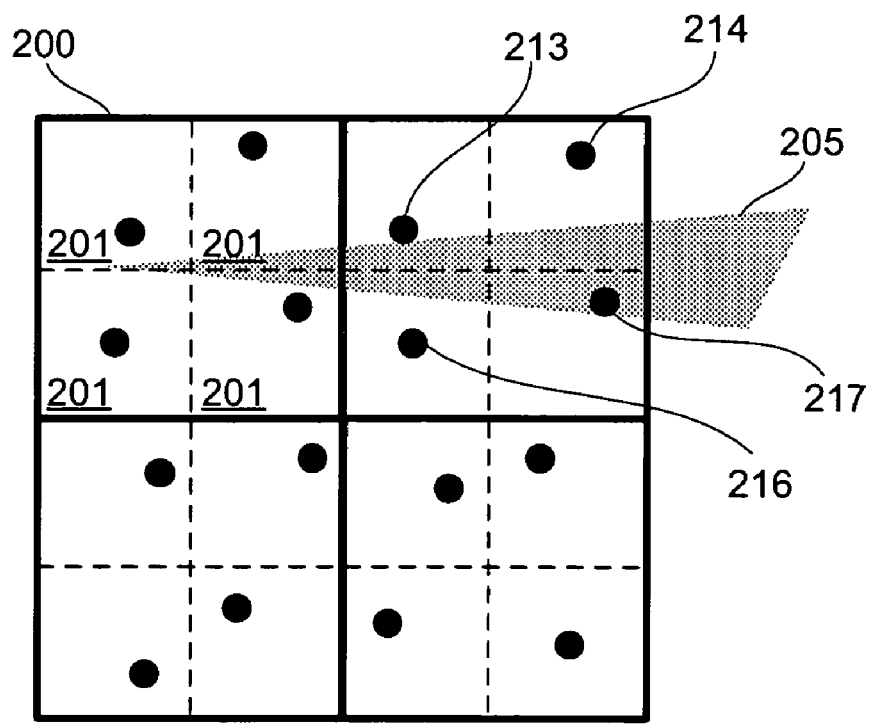

FIGS. 2A and 2B illustrate sub-pixel sample positions within pixels in accordance with one or more aspects of the present invention. A Region 200 including four pixels, each pixel including four Cells 201. Each Cell 201 contains one sub-pixel sample position, such as Sub-pixel Sample Position 203. Fragments of a Primitive 205 are within two pixels in Region 200, however in FIG. 2A Sub-pixel Sample Positions 203, 204, 206, and 207 are aligned in a regular pattern and are not covered by a portion of Primitive 205. Therefore, a coverage mask for the pixel including Sub-pixel Sample Positions 203, 204, 206, and 207 is generated by Rasterizer 150 indicating no sub-pixel sample positions are covered and Primitive 205 does not contribute to the final color of the pixel. Therefore aliasing appears because only a small portion of Primitive 205 lying outside of Region 200 may contribute to the final image.

In FIG. 2B Sub-pixel Sample Positions 213, 214, 216, and 217 are jittered to increase the likelihood a small or narrow primitive will cover one or more sub-pixel sample positions. Although Sub-pixel Sample Positions 213, 216, and 214 are not covered by the portion of Primitive 205, Sub-pixel Sample Position 217 is covered. Therefore, a coverage mask for the pixel including Sub-pixel Sample Positions 213, 214, 216, and 217 is generated by Rasterizer 150 indicating Sub-pixel Sample Position 217 is covered and Primitive 205 may contribute to the final color of the pixel. Each jittered sub-pixel sample position lies within a cell and within a pixel.

Using jittered sub-pixel sample positions reduces the likelihood that a small primitive or fragment will be lost. Furthermore, the human perception system is tuned to detect regular patterns, appearing as aliasing and other artifacts. Jittering removes the regularity from a sampling pattern such as the pattern shown in FIG. 2A resulting in an image with reduced aliasing. Sub-pixel offset values to produce an irregular jittered sub-pixel sample position pattern may be programmed for use by Rasterizer 150 during scan conversion and coverage mask generation. However when a single jittered subpixel pattern is used for every pixel, aliasing will appear due to a perceived pattern. Therefore, a jitter pattern should vary from pixel to pixel, i.e. have a greater period, to effectively reduce aliasing.

FIGS. 3A, 3B, and 3C illustrate storage of one or more sub-pixel offset values in accordance with one or more aspects of the present invention. In FIG. 3A a single sub-pixel offset value, Offset Value 305 is programmed, i.e., stored in PSGU 170, for use by Rasterizer 150 and Raster Operations Unit 165. Offset Value 305 is programmed using a program instruction or the like. When Offset Value 305 is set to only 0.25 (0.25 is used in each dimension, e.g. x and y) the regular sub-pixel sample position pattern shown in FIG. 2A is specified. It is sometimes desirable to produce an image generated using a regular sub-pixel sample position pattern, such as for backwards compatibility, therefore the ability to program the sub-pixel offset values to achieve a regular sample pattern is needed. In one embodiment Offset Value 305 is an unsigned number. In an alternate embodiment Offset Value 305 is a signed number. A method for computing the sub-pixel sample positions using one or more sub-pixel offset values is described in relation to FIG. 4A.

FIG. 3B illustrates storage of seven sub-pixel offset values, Offset Values 310, 315, 320, 325, 330, 335, and 340. An alternate embodiment includes storage of additional sub-pixel offset values. As the number of sub-pixel offset values increases, the period of the jitter pattern across the image also increases over multiple pixels. In contrast to a method using a fixed number of sub-pixel offset values, a number of sub-pixel offset values may be stored dependent on the resolution of the image to be displayed so that the jitter pattern is effectively non-periodic.

Each Offset Value may be applied as either a horizontal (x) or vertical (y) offset to a pixel position to produce a jittered sub-pixel sample position, as described further herein. Alternatively, each Offset Value may be applied as a horizontal (x) and vertical (y) offset to a pixel position to produce a jittered sub-pixel sample position. Offset Values 310, 315, 320, 325, 330, 335, and 340 may each be programmed to produce the jittered sub-pixel sample position pattern shown in FIG. 2B. FIG. 3C illustrates seven programmed unsigned sub-pixel offset values specifying a jittered sub-pixel sample position pattern, as described further herein.

FIG. 4A illustrates an embodiment of a method for computing a sub-pixel sample position using one or more sub-pixel offset values in accordance with one or more aspects of the present invention. In step 405 Rasterizer 150 or Raster Operations Unit 165 reads a sub-pixel offset value stored in PSGU 170 to process a primitive. In step 410 Rasterizer 150 or Raster Operations Unit 165 reads another sub-pixel offset value stored in PSGU 170. When there is only a single sub-pixel offset value, such as shown in FIG. 3A the sub-pixel offset value is read in steps 405 and 410. In some embodiments Fragment Shader 155 reads sub-pixel offset values stored in PSGU 170 to process a primitive, i.e., to compute sub-pixel color values.

In step 415, when unsigned offsets are used, Rasterizer 150, PSGU 170, or Raster Operations Unit 165 determines if the sub-pixel sample position to be computed is in a cell in the left half of a pixel, and, if so, in step 425, the sub-pixel offset value read in step 405 is subtracted from the pixel position horizontal coordinate (x) to compute an x component for sub-pixel sample position. In an alternate embodiment, the sub-pixel offset value read in step 410 is subtracted from the pixel position horizontal coordinate. If, in step 415 Rasterizer 150 PSGU 170, or Raster Operations Unit 165 determines the sub-pixel sample position to be computed is not in a cell in the left half of the pixel, the sub-pixel offset value read in step 405 is added to the pixel position horizontal coordinate (x) to compute an x component for sub-pixel sample position.

For example, using a single sub-pixel offset value of 0.25, a computed x component for sub-pixel sample position is either 0.25 or −0.25. A sub-pixel offset value may range from 0 to 0.50, where 0.50 places a sub-pixel sample on a cell boundary. In an alternate embodiment, a sub-pixel offset value may range from 0 to 0.49 when subtracted and may range from 0 to 0.50 when added, so that neighboring sub-pixel samples will not occupy the same sub-pixel position. Furthermore, computed sub-pixel sample positions are adjusted as needed to ensure that they lie within a cell. In an alternate embodiment, a software driver restricts the subpixel offset values to those which will result in a sub-pixel sample positions that lies within a cell.

Continuing in step 430, Rasterizer 150, PSGU 170, or Raster Operations Unit 165 determines if the sub-pixel sample position to be computed is in a cell in the lower half of the pixel, and, if so, in step 440, the sub-pixel offset value read in step 410 is subtracted from the pixel position vertical coordinate (y) to compute a y component for sub-pixel sample position. In an alternate embodiment, the sub-pixel offset value read in step 405 is subtracted from the pixel position vertical coordinate. If, in step 430 Rasterizer 150, PSGU 170, or Raster Operations Unit 165 determines the sub-pixel sample position to be computed is not in a cell in the lower half of the pixel, the sub-pixel offset value read in step 410 is added to the pixel position vertical coordinate (y) to compute a y component for sub-pixel sample position. For example, using the single sub-pixel offset value of 0.25, the computed sub-pixel sample positions when four sub-pixel samples are specified as shown in FIG. 2A are (0.25, 0.25), (0.25, −0.25), (−0.25, 0.25), and (−0.25, −0.25).

In an alternate embodiment, a pixel position may be on the edge of the pixel instead of in the center of the pixel and the domain of a cell may range from 0 to 1.0 or range from 0 to 0.99, or the like. In the alternate embodiment step 415 and either step 420 or step 425 may be omitted dependent on the location of the pixel position. Likewise, step 430 and either step 435 or step 440 may be omitted, also dependent on the location of the pixel position.

Continuing in step 445, Rasterizer 150 processes the computed sub-pixel sample position to produce pixel coverage data, and the like, for a fragment generated during scan conversion. Raster Operations Unit 165 processes the computed sub-pixel sample position to compute a depth value for the sub-pixel sample position within the fragment. In some embodiments, Fragment Shader 155 processes the computed sub-pixel sample position to compute a color value for the sub-pixel sample position within the fragment. Steps 405, 410, 415, 430, and 445 are repeated and steps 420, 425, 435, and 440 are optionally repeated, reading additional sub-pixel offset values in step 405 and 410, to produce additional sub-pixel sample positions within other pixels.

FIGS. 4B and 4C illustrate jittered sub-pixel sample positions within a pixel. The jittered sub-pixel sample positions are computed using the sub-pixel offset values shown in FIG. 3C in accordance with one or more aspects of the present invention. Sub-pixel Sample Position 450 in FIG. 4B is computed using sub-pixel offset values 0.25 and 0.40 to produce a sub-pixel sample position of (−0.25, 0.40). Sub-pixel Sample Position 455 is computed using sub-pixel offset values 0.30 and 0.10 to produce a sub-pixel sample position of (0.30, 0.10). Sub-pixel Sample Position 460 is computed using sub-pixel offset values 0.05 and 0.13 to produce a sub-pixel sample position of (−0.05, −0.13). Sub-pixel Sample Position 465 is computed using sub-pixel offset values 0.48 and 0.25 to produce a sub-pixel sample position of (0.48, −0.25). Notice that 0.25 was used as a horizontal sub-pixel offset to compute Sub-pixel Sample Position 450 and was also used as a vertical sub-pixel offset to compute Sub-pixel Sample Position 465. The sub-pixel offset values will be used as horizontal and vertical sub-pixel offsets when the number of sub-pixel offset values stored is odd, effectively doubling the number of unique sub-pixel sample positions compared with using each sub-pixel offset value as either a horizontal sub-pixel offset or a vertical sub-pixel offset. Furthermore, when the number of sub-pixel offset values stored is a prime number the periodicity of the jitter pattern is reduced compared with storing an odd number of sub-pixel offset values.

The computation of sub-pixel sample positions for a next pixel uses the next sub-pixel offset value. Sub-pixel Sample Position 470 in FIG. 4C is computed using sub-pixel offset values 0.40 and 0.30 to produce a sub-pixel sample position of (−0.40, 0.30). Sub-pixel Sample Position 475 is computed using sub-pixel offset values 0.10 and 0.05 to produce a sub-pixel sample position of (0.10, 0.05). Sub-pixel Sample Position 480 is computed using sub-pixel offset values 0.13 and 0.48 to produce a sub-pixel sample position of (−0.13, −0.48). Sub-pixel Sample Position 485 is computed using sub-pixel offset values 0.25 and 0.40 to produce a sub-pixel sample position of (0.25, −0.40).

Using seven sub-pixel offset values in this manner results in a sub-pixel sample jitter pattern that is repeated every seventh pixel. Additional sub-pixel offset values may be programmed to reduce the periodicity of the sub-pixel sample jitter pattern. Storing programmable sub-pixel offset values allows flexibility in determining sub-pixel sample positions, including jittered sub-pixel sample positions that vary over several pixels to reduce aliasing.

Computed sub-pixel sample positions should be at consistent positions within each pixel to ensure temporal aliasing artifacts are not introduced. For example, a line of intersection between two primitives should be antialiased consistently between frames when the viewpoint has not changed. If the sub-pixel sample positions change for one or both of the two primitives the sub-pixel depth values may change, possibly changing the outcome of a hidden surface removal procedure. Similarly, the edge of a primitive should be antialiased consistently between frames when the viewpoint has not changed, therefore the pixel coverage for each pixel along the edge of the primitive should be consistent. Rather than simply using the next sub-pixel offset value to compute each sub-pixel sample position for a pixel when processing a fragment, a pixel position for the pixel should be used to select the sub-pixel offset value, as described further herein.

FIG. 5 is a block diagram of an exemplary embodiment of PSGU 170 of FIG. 1 in accordance with one or more aspects of the present invention. PSGU 170 receives pixel positions (x,y coordinates) from Rasterizer 150 and Raster Operations Unit 165. Each pixel position is received by an Offset Access Unit 505 and an index, dependent on a portion of the pixel position, is output. For example, the index function (determined and loaded by a software driver) may be stored in a programmable table, e.g., register file, read from and written to using two or more of the low bits of each pixel position coordinate. Specifically, in one embodiment, two low bits of the x coordinate access an index and two low bits of the y coordinate access another index. Alternatively, two low bits of the x coordinate are concatenated with two low bits of the y coordinate to access a single index. In one embodiment a hash function is applied to x, y, or x and y to generate at least one index. The pixel position is output by Offset Access Unit 505 to a Sample Computation Unit 515, described further herein.

A Control Unit 520 generates a write control signal to load the index data into Offset Access Unit 505. Control Unit 520 receives the index data, address, and instruction from Rasterizer 150. In an embodiment where Rasterizer 150 and Raster Operations Unit 165 each include a PSGU 170, the PSGU 170 within Raster Operations Unit 165 receives the index data, address, and instruction from Rasterizer Operations Unit 165.

The index or the indices (separate for the x and y coordinates) are received by a Storage Element 510. Storage Element 510 includes one or more registers, or the like, to store one or more sub-pixel offset values. Control Unit 520 also generates the write control signal to load the one or more sub-pixel offset values into Storage Element 510. Storage Element 510 outputs a horizontal jitter sub-pixel offset value and a vertical jitter sub-pixel offset value, each sub-pixel offset value read using the one or more indices. Sample Computation Unit 515 receives the horizontal jitter sub-pixel offset value, the vertical jitter sub-pixel offset value, and the pixel position and computes a sub-pixel sample position. The sub-pixel sample position is output to Rasterizer 150 or Raster Operations Unit 165. In an alternate embodiment, Sample Computation Unit 515 is omitted and the horizontal jitter sub-pixel offset value and the vertical jitter sub-pixel offset value are output to Rasterizer 150 or Raster Operations Unit 165. Accessing programmed sub-pixel offset values using pixel position data allows flexibility in determining sub-pixel sample positions and ensures the sub-pixel sample positions are consistent when processing fragments for each pixel.

FIG. 6 illustrates an embodiment of a method of computing sub-pixel sample positions using a portion of a pixel position including the steps described in relation to FIG. 4A. In step 600 a pixel position is received by PSGU 170 from Rasterizer 150 or Raster Operations Unit 165. In step 605 an index, dependent on a pixel position coordinate, e.g., x, is output by Offset Access Unit 505 within PSGU 170 to Storage Element 510. In step 405 the index is received by Storage Element 510 and a first sub-pixel offset value is read and output to Sample Computation Unit 515. In step 610 another index, dependent on another pixel position coordinate, e.g., y, is output by Offset Access Unit 505 within PSGU 170 to Storage Element 510. In step 405 the index is received by Storage Element 510 and a second sub-pixel offset value is read and output to Sample Computation Unit 515. Steps 415, 420, 425, 430, 435, and 440 proceed as previously described.

In step 645 Sample Computation Unit 515 outputs a computed sub-pixel sample position to Rasterizer 150 or Raster Operations Unit 165. In step 650 PSGU 170 determines if another sub-pixel sample position should be generated for the pixel position. PSGU 170 is configured by one or more program instructions to store data indicating a number of sub-pixel sample positions to be computed for each pixel. If, in step 650 PSGU 170 determines another sub-pixel sample position should be generated for the pixel position, PSGU 170 returns to step 605. If, in step 650 PSGU 170 determines another sub-pixel sample position should not be generated for the pixel position, in step 655 PSGU 170 determines if another pixel position is received, and, if so, PSGU 170 returns to step 600. Otherwise, PSGU 170 remains in step 655 waiting for another pixel position to be received from Rasterizer 150 or Raster Operations Unit 165.

In an alternate embodiment step 610 is omitted and an index dependent on at least a portion of the pixel position (x and y) is used to read the first sub-pixel offset value and the second sub-pixel offset value. In either embodiment programmed sub-pixel offset values are accessed using at least a portion of the pixel position ensuring the sub-pixel sample positions are consistent when processing fragments for the pixel position.

FIG. 7 illustrates a Pixel 700 covered by a Primitive 705 which does not cover the pixel position, a Pixel Center 715. Coverage data produced by Rasterizer 150 during scan conversion of a fragment formed by the intersection of Pixel 700 and Primitive 705 indicates a Sub-pixel Sample Position 710 is covered by the fragment. However, Fragment Shader 155 may compute illegal color values using parameters, e.g., color values, texture coordinates, and the like, generated by Rasterizer 150 corresponding to pixel position such as Pixel Center 715, lying outside of Primitive 705. When the pixel position does not lie within a fragment and a pixel boundary, Rasterizer 150 generates the parameters using a sub-pixel sample position that is within the fragment and the pixel, such as Sub-pixel Sample Position 710.

Programmable sub-pixel offset values may be used to specify jittered sub-pixel sample positions, reducing aliasing while permitting Fragment Processing Pipeline 150 to also generate images using aligned sub-pixel sample positions for backward compatibility. Furthermore, a jitter pattern varying over several pixels may be specified using programmed sub-pixel offset values.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A programmable graphics processor for generating antialiased images utilizing a non-periodic jitter pattern that varies from pixel to pixel, comprising:
   a storage element configured to store programmed sub-pixel offset values, wherein the number of sub-pixel offset values stored is dependent on the resolution of the image to be displayed;
   an offset access unit coupled to the storage element, the offset access unit configured to read a portion of the sub-pixel offset values based on at least a portion of the coordinates of a pixel position;
   a sample computation unit configured to combine the pixel position and the portion of the programmed sub-pixel offset values, read from the storage element, dependent on the resolution of the image to be displayed to produce a jittered sub-pixel sample position for each and every sub-pixel sample cell within each pixel of an antialiased image so that the jitter pattern is effectively non-periodic, but is antialiased consistently from frame to frame, each sub-pixel offset value being either added to or subtracted from the pixel position coordinate to establish the sub-pixel sample position based on whether the sub-pixel sample position is in the left or right half of the cell;
   a rasterizer configured to produce sub-pixel coverage data associated with a fragment using the jittered sub-pixel sample positions;
   a shader configured to compute a depth value corresponding to the fragment depth at the pixel position; and
   a raster operations unit configured to produce sub-pixel depth values using the depth value corresponding to the fragment depth at the pixel position and the jittered sub-pixel sample positions.

2. The programmable graphics processor of claim 1, wherein the offset access unit reads the portion of the sub-pixel offset values using at least a portion of the pixel position.

3. The programmable graphics processor of claim 1, wherein the sub-pixel offset value is either added to or subtracted from the pixel position coordinate to establish the sub-pixel sample position based on whether the sub-pixel sample position is in the left or right half of the cell.

4. The programmable graphics processor of claim 1, wherein the storage element contains an odd number of sub-pixel offset values so that the same offset value may be used for both horizontal and vertical offset.

5. The programmable graphics processor of claim 1, further comprising a software driver configured to restrict the programmed sub-pixel offset values to those which will result in sub-pixel sample positions that are within the boundary of a pixel associated with the pixel position.

6. The programmable graphics processor of claim 1, wherein the raster operations unit is configured to process the sub-pixel depth values within the fragment as indicated by the sub-pixel coverage data.

7. The programmable graphics processor of claim 1, wherein the shader is configured to compute a color value corresponding to the fragment.

8. The programmable graphics processor of claim 7, wherein the color value corresponds to the fragment color at the pixel position.

9. The programmable graphics processor of claim 7, wherein the color value corresponds to the fragment color at another pixel position within the fragment when the pixel position does not lie within the fragment.

10. The programmable graphics processor of claim 1, wherein a single programmed sub-pixel offset value is combined with both an X coordinate and a Y coordinate of the pixel position to produce the jittered sub-pixel sample positions.

11. The programmable graphics processor of claim 1, wherein the sample computation unit is further configured to combine the pixel position and the portion of the programmed sub-pixel offset values by adding a first programmed sub-pixel offset value to a Y coordinate of the pixel position when the sub-pixel sample cell is located in an upper half of the pixel.

12. The programmable graphics processor of claim 1, wherein the sample computation unit is further configured to combine the pixel position and the portion of the programmed sub-pixel offset values by subtracting a first programmed sub-pixel offset value from a Y coordinate of the pixel position when the sub-pixel sample cell is located in a lower half of the pixel.

13. The programmable graphics processor of claim 1, wherein the sample computation unit is further configured to combine the pixel position and the portion of the programmed sub-pixel offset values by subtracting a first programmed sub-pixel offset value from an X coordinate of the pixel position when the sub-pixel sample cell is located in a left half of the pixel.

14. A method of determining sub-pixel sample positions for a pixel position to reduce aliasing utilizing a non-periodic jitter pattern that varies from pixel to pixel, the method comprising:
determining pixel positions for a plurality of pixels in an image;
determining a plurality of sub-pixel sample cells for each of the pixels;
storing a number of sub-pixel offset values, wherein the number of sub-pixel offset values stored is dependent on the resolution of the image to be displayed;
selecting a sub-pixel offset value for each and every one of the sub-pixel sample cells within each of the pixels based on the pixel positions, wherein the stored sub-pixel offset values are accessed using selected bits of the pixel position coordinates;
combining the selected sub-pixel offset values with the pixel positions to determine a sub-pixel sample pattern defining the location of each cell of the plurality of sub-pixel sample cells based on the pixel position being sampled, each sub-pixel offset value being either added to or subtracted from the pixel position coordinate to establish the sub-pixel sample position based on whether the sub-pixel sample position is in the left or right half of the cell; and
rendering graphics primitives representing the image using the sub-pixel sample pattern to produce an anti-aliased image for display, wherein the sub-pixel sample pattern used is non-periodic so that the jitter pattern is non-periodic, but is antialiased consistently from frame to frame.

15. A method as claimed in claim 14, wherein the sub-pixel offset value is added to a coordinate of the pixel position for sub-pixel sample cells in an upper half or a right half of the pixel.

16. A method as claimed in claim 14, wherein the sub-pixel offset value is applied as both a horizontal and vertical offset to the X,Y pixel position.

17. A method as claimed in claim 14, wherein the sub-pixel offset values are stored in a lookup table having a length dependent on the desired period between use of the offset value.

* * * * *

UNITED STATES PATENT AND TRADEMARK OFFICE
CERTIFICATE OF CORRECTION

PATENT NO.        : 7,403,208 B1
APPLICATION NO. : 11/389602
DATED             : July 22, 2008
INVENTOR(S)       : Bastos et al.

Page 1 of 1

It is certified that error appears in the above-identified patent and that said Letters Patent is hereby corrected as shown below:

On the Title page, item [75], please replace "Rui M. Bastos, Santa Clara, CA (US)" with -- Rui M. Bastos, Porto Alegre (BR) --.

Signed and Sealed this

Twenty-fourth Day of March, 2009

JOHN DOLL
*Acting Director of the United States Patent and Trademark Office*